(No Model.)
J. S. SOBEY.
GRATER.
No. 564,656. Patented July 28, 1896.
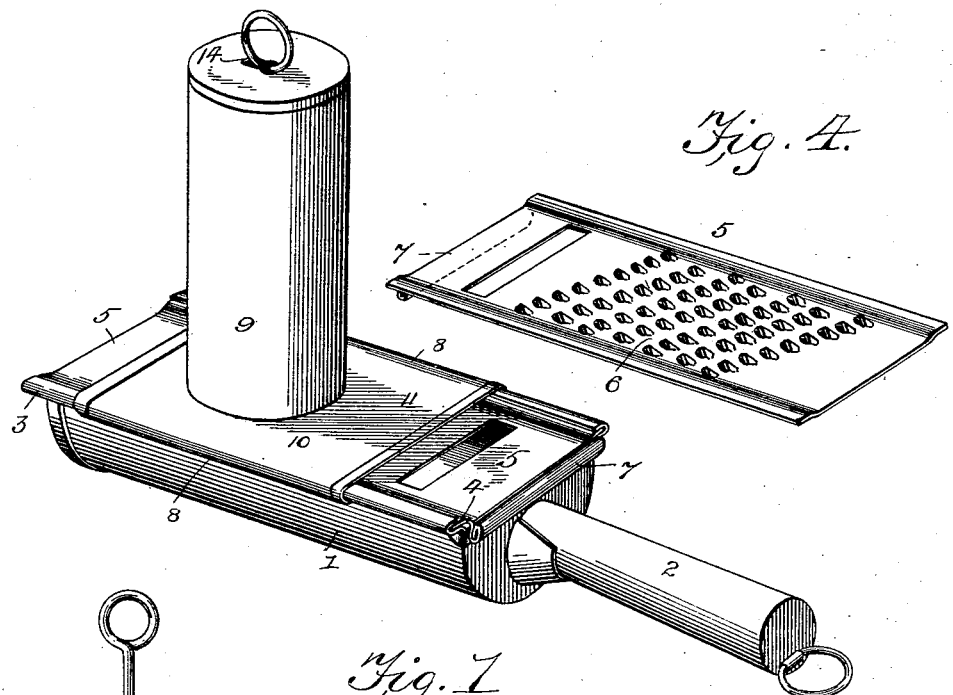
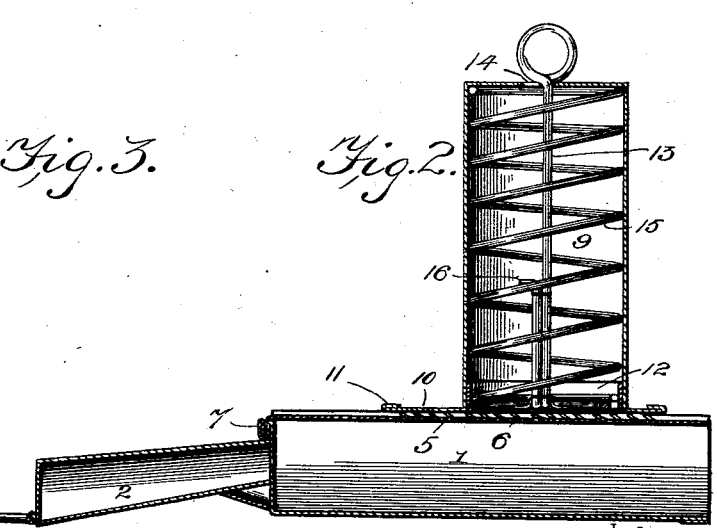
Witnesses
Ed. H. Monroe
J. F. Riley
By his Attorneys,
C. A. Snow & Co.
Inventor
John S. Sobey,

UNITED STATES PATENT OFFICE.

JOHN S. SOBEY, OF CALUMET, MICHIGAN.

GRATER.

SPECIFICATION forming part of Letters Patent No. 564,656, dated July 28, 1896.

Application filed August 10, 1895. Serial No. 558,892. (No model.)

*To all whom it may concern:*

Be it known that I, JOHN S. SOBEY, a citizen of the United States, residing at Calumet, in the county of Houghton and State of Michigan, have invented a new and useful Grater, of which the following is a specification.

The invention relates to improvements in graters.

The object of the present invention is to improve the construction of graters and to provide a simple, inexpensive, and efficient one adapted for grating lemons, potatoes, and the like and capable of being conveniently arranged for the use of the operator.

The invention consists in the construction and novel combination and arrangement of parts hereinafter fully described, illustrated in the accompanying drawings, and pointed out in the claims hereto appended.

In the drawings, Figure 1 is a perspective view of a grater constructed in accordance with this invention. Fig. 2 is a central longitudinal sectional view. Fig. 3 is a transverse sectional view. Fig. 4 is a detail perspective view of the reversible grater-plate.

1 designates a semicylindrical trough constructed of sheet metal and having one end open and its other end closed and provided with a handle 2, rigidly secured to the end of the trough. The longitudinal edges of the trough are bent outward to form projecting flanges 3, and are folded inward to form opposite grooves or ways 4 for the reception of a removable grater-plate 5. The grater-plate 5 is inserted longitudinally in the grooves or ways 4, and is provided with a grating-surface 6, and has one end provided with a depending flange 7, engaging the closed end of the trough and forming a stop.

The projecting edges or flanges of the trough engage grooves or ways 8 of a cylindrical casing 9, which is removably mounted on the trough and is provided at its inner end with a plate 10, having its edges bent inward to form the said grooves or ways 8. The outer end of the cylindrical casing 9 is closed, and its inner end is open, the plate 10 being provided with a circular opening registering with the inner end of the casing, and the plate is extended at 11 at the inner or upper side to permit the casing to be moved outward beyond the lower end of the trough to expose the open lower end of the casing for the insertion of a lemon, potato, or the like to be grated. This extension 11 permits a lemon or potato to be placed in the cylindrical casing without disconnecting the latter entirely from the trough.

Within the cylindrical casing is mounted a circular follower 12, which is secured to a rod 13, and the latter extends through a keyhole-slot 14 of the outer end of the casing and terminates in a ring, forming a handle and operating as a stop to limit the inward movement of the follower. The follower is forced inward by a spiral spring 15, arranged within the casing and interposed between the outer end thereof and the follower, and the rod is provided near its inner end with a lug 16 of a size to pass through the narrow portion of the keyhole-slot, whereby the lug, after being passed through the slot, is adapted to be turned away from the same to engage the outer end of the casing to hold the follower drawn back.

The follower is drawn backward and is locked in this position when it is desired to insert a lemon, potato, or the like to be grated. The casing is then moved downward or outward beyond the outer or lower end of the trough to expose its open lower end, and the lemon, potato, or the like is then introduced and the casing returned to its former position over the grating-surface of the plate 5. The tongues or projections of the grating-surface of the plate 5 point upwardly away from the open end of the trough, and the lemon or potato is grated by moving the casing downward over the grating-surface, the spring holding the lemon or potato in contact with the grating-surface, and the depending flange of the plate 5 preventing the latter from becoming displaced. After the grating operation has been completed the grater-plate may be readily withdrawn for the purpose of cleaning it, and the rod is of sufficient length to permit the follower to approach close to the lower or inner end of the casing, but prevents the same from coming in contact with the grating-surface.

It will be seen that the grater is simple and inexpensive in construction, that it will enable lemons, potatoes, and the like to be rapidly grated, and that it may be readily cleaned after the operation of grating has been completed. It will also be apparent that a lemon or potato may be introduced into the casing without detaching the latter from the trough.

Changes in the form, proportion, and the minor details of construction may be resorted to without departing from the principle or sacrificing any of the advantages of this invention.

What I claim is—

1. In a grater, the combination of a trough provided at its side edges with outwardly-extending flanges and having inwardly-extending flanges forming ways, a removable grater-plate arranged in the ways of the trough, and a casing slidingly mounted on the outwardly-extending flanges, substantially as described.

2. In a grater, the combination of a trough, a grater-plate, a casing slidingly mounted on the trough and provided at its outer end with a keyhole-slot, a spring-actuated follower, and a rod secured to the follower and extending through the keyhole-slot and provided with a lug adapted to pass through the slot and to be turned transversely thereof to engage the exterior of the casing, whereby the follower is held retracted, substantially as described.

In testimony that I claim the foregoing as my own I have hereto affixed my signature in the presence of two witnesses.

JOHN S. SOBEY.

Witnesses:
S. SILVOLA,
JOHN E. JOHENSAN.